United States Patent
Hunter et al.

(10) Patent No.: US 11,143,306 B1
(45) Date of Patent: Oct. 12, 2021

(54) SELF-ALIGNING SEAL

(71) Applicant: TRISTAR DESIGN AND MANUFACTURING, INC., Queen Creek, AZ (US)

(72) Inventors: Caleb Hunter, Queen Creek, AZ (US); Rick Lorenzen, Mesa, AZ (US); Matthew Hunter, Queen Creek, AZ (US); Benjamin Hunter, Chandler, AZ (US)

(73) Assignee: Tristar Design and Manufacturing, Inc., Queen Creek, AZ (US)

( * ) Notice: Subject to any disclaimer, the term of this patent is extended or adjusted under 35 U.S.C. 154(b) by 0 days.

(21) Appl. No.: 15/877,171

(22) Filed: Jan. 22, 2018

Related U.S. Application Data

(60) Provisional application No. 62/449,493, filed on Jan. 23, 2017.

(51) Int. Cl.
*F16J 15/3232* (2016.01)
*B02C 2/04* (2006.01)
*B02C 2/00* (2006.01)

(52) U.S. Cl.
CPC .......... *F16J 15/3232* (2013.01); *B02C 2/007* (2013.01); *B02C 2/04* (2013.01)

(58) Field of Classification Search
CPC .......... F16J 15/3232; B02C 2/007; B02C 2/04
See application file for complete search history.

(56) References Cited

U.S. PATENT DOCUMENTS

| | | | | |
|---|---|---|---|---|
| 2,797,944 A | * | 7/1957 | Riesing | F16J 15/3248 277/573 |
| 4,322,175 A | * | 3/1982 | Szczesny | F16B 21/20 277/635 |
| 7,469,906 B2 | * | 12/2008 | Peet | F16J 15/061 277/637 |
| 7,931,279 B2 | * | 4/2011 | Niwa | F16J 3/042 277/630 |
| 7,980,564 B2 | * | 7/2011 | Niwa | F16C 11/0671 277/634 |
| 2018/0243745 A1 | * | 8/2018 | Niklewski | B02C 2/04 |

FOREIGN PATENT DOCUMENTS

EP          3132851 A1 * 2/2017 ............... B02C 2/04

* cited by examiner

*Primary Examiner* — Gilbert Y Lee
(74) *Attorney, Agent, or Firm* — Adam R, Stephenson, Ltd.

(57) ABSTRACT

A self-aligning dust seal assembly for rock crusher machines and particularly gyratory crusher machines has a dust seal and a seal guide that extends from the dust seal in a cone shape to enable alignment of the dust seal when the main shaft is lowered into position. The dust seal has a body portion that is disc shaped. There is an inner seal surface around the inner perimeter of the dust ring that seals against an inner element of the crusher. The seal guide extends down and outward from a connected portion with the dust seal that is proximal the inner perimeter of the dust seal. The seal guide is cone shaped and extends outward in a convex shape from the connected portion. The cone shape of the seal guide may nest on a corresponding flange that is fixed in the rock crusher machine, for example.

21 Claims, 7 Drawing Sheets

SELF-ALIGNING SEAL

RELATED APPLICATION

This nonprovisional patent application claims the benefit of U.S. Provisional No. 62/449,493, filed on Jan. 23, 2017.

TECHNICAL FIELD

This application relates generally to dust seal assemblies for rock crushers.

BACKGROUND

The mining industry has a centuries-long history and tradition of performing some of the toughest, most dangerous jobs. The US Mine Safety and Health Administration was only created in 1978, but now tracks fatalities by facility and contractor. Because most mining activities are performed outside of urban centers, injuries cannot be treated promptly, which also contributes to mortality.

After rock with valuable minerals is obtained from the ground, the next step is often crushing and grinding to particular sizes of rock, enabling efficient processing. Crushers also have been around a long time, with few changes in technology in recent decades. Crushing equipment, built to withstand and process rocks, lasts decades. Sealing of the equipment limits contamination of the oil reservoir and damage to critical mechanical parts. However, over time, the equipment needs to be cleaned, repaired and resealed.

SUMMARY OF INVENTION

An exemplary dust seal assembly of the present invention comprises a dust seal and seal guide. The dust seal has a body portion that is a ring having a circular aperture therethrough. There is an inner seal surface around the inner perimeter of the ring that seals against an inner element of the crusher, such as an air tower or dust seal bonnet. The seal guide extends down from a connected portion with the dust seal and the connect portion is proximal the inner perimeter of the dust seal. The seal guide is cone shaped and extends outward in a convex shape from the connected portion. The cone shape of the seal guide allows the seal guide assembly to self-align in position when the main shaft is lowered into the rock crusher machine. The cone shape of the seal guide may nest on a corresponding flange that is fixed in the rock crusher machine for example.

In an exemplary embodiment, the inner seal surface of the dust seal assembly is made up only by the dust seal; wherein the seal guide does not extend to the inner seal surface. A dust seal may comprise a seal extension that extends down from the seal body portion along the inner seal surface. The seal body portion is the ring having an inner and outer perimeter, width and thickness, as described herein, and may be considered to be similar in shape to a washer, disc or flat gasket. The seal extension may be an integral part of the dust seal and be integrally made with the seal body, such as by molding, machining and the like to form a single contiguous material. The seal body and seal extension may be made from a single piece of material, in other words. The seal guide may be attached to the dust seal by a fastener, such as by one or more bolts or screws.

In an exemplary embodiment, the seal guide extends down at cone angle, or the angle from horizontal that defines the cone shape. The cone angle may be from about 20 to 60 degrees, or at least about 20 degree, at least about 40 degrees, at least about 50 degrees, at least about 60 degrees or no more than about 70 degrees and any range between and including the cone angles provided.

The dust seal and the seal guide may be manufactured from different materials. Both must have slippery surfaces to slide into place and move up and down, or float; the surfaces. The dust seal may be made out of material that are selected for sealing and low friction properties, such as fluoropolymers, such as TEFLON®, plastics, elastomers, silicones, and the like. The seal guide may be made out of more rigid materials to enable self-alignment of the dust seal assembly. A soft and pliable material may flex and bend and not adequately provide the required forces to align the dust seal assembly. A seal guide may be made out of steel, polyoxymethylene (POM), also known as acetal, polyacetal and polyformaldehyde, which is a thermoplastic sold by such names as DELRIN, CELCON, RAMTAL, DURACON, KEPITAL and HOSTAFORM.

The seal guide assembly may be attached to the main shaft prior to lowering the main shaft into the rock crusher machine. A seal channel may be formed by the main shaft and a seal retainer. The seal body portion may be configured within the channel and retained therein. A portion of the seal body portion may extend out from the seal channel to the inner seal surface that rests against an inner seal element, such as an air tower. The dust seal assembly has three seal areas, the top seal portion, along the dust seal top surface and the main shaft, the bottom seal portion, along the dust seal bottom surface and along the inner seal surface and the inner seal element. The seal guide may extend down and below the seal retainer.

The summary of the invention is provided as a general introduction to some of the embodiments of the invention, and is not intended to be limiting. Additional example embodiments including variations and alternative configurations of the invention are provided herein.

BRIEF DESCRIPTION OF DRAWINGS

The accompanying drawings are included to provide a further understanding of the invention and are incorporated in and constitute a part of this specification, illustrate embodiments of the invention, and together with the description, serve to explain the principles of the invention.

DETAILED DESCRIPTION

Figure 1:
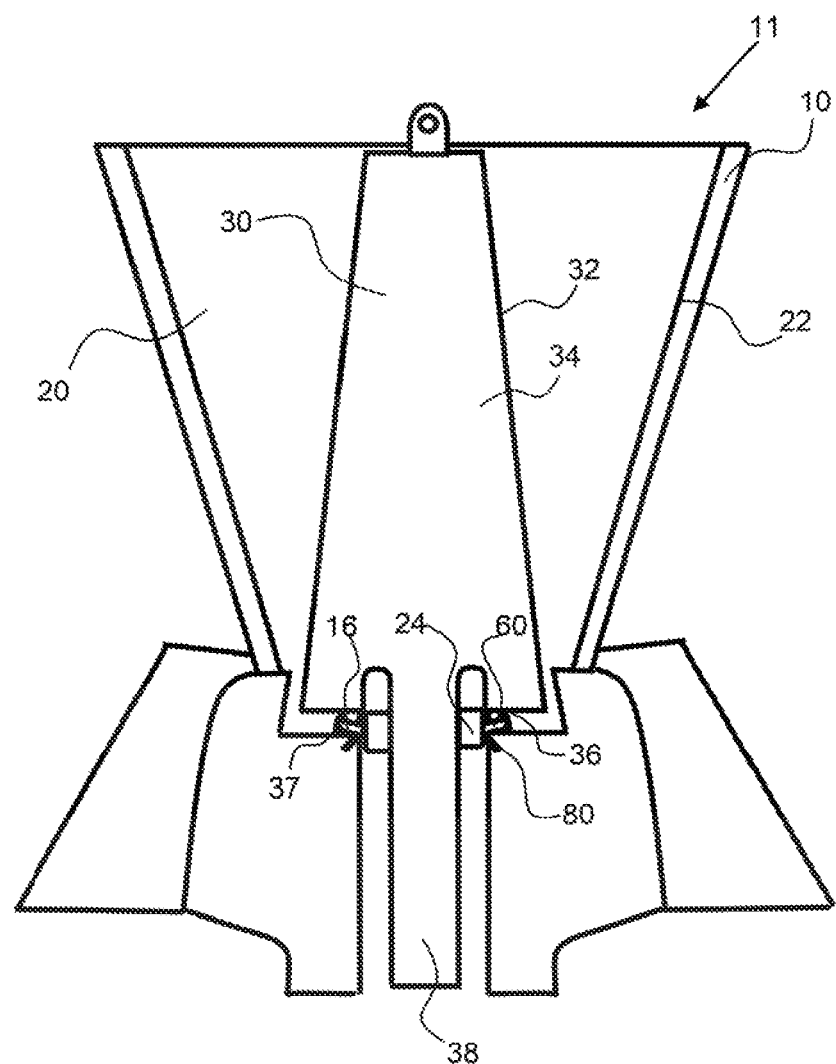
FIG. 1 shows a cross-sectional view of a gyratory crusher having a main shaft in a stationary bowl and a dust seal.

We have visited multiple mines in different parts of the world and observed processes. In particular, we watched carefully as personnel relined their crushers. Crushers need to be taken apart and reassembled when, for example, too-large rocks get stuck between chambers. That can occur with large rocks entering the crusher or by large fragments getting stuck on top of or before the screen to size the rock fragment output. Each time, the main shaft needs to be removed and re-aligned with the eccentric bushing. A circular seal surrounds the main shaft and needs to be carefully aligned with the eccentric bushing, too. The seal needs to "float" to match the gyration or "throw" of the main shaft, which crushes the rocks. Precise alignment is needed to assure a seal between the main shaft and eccentric bushing, or else crushed rock and particles escape to clog the oil whose action is essential to critical parts.

The main shaft of gyratory crushers requires periodic maintenance or replacement which requires them to be removed from the stationary bowl. In addition, the main shafts must be removed in the event that rocks become lodged in the crusher. The main shaft is very heavy in most cases (as much as 150 tons) and requires a lift by a crane for removal and replacement. Each time the main shaft is lowered back into the eccentric bushing of the gyratory crusher, the dust seals require aligning, typically manually.

We identified a common problem with the frequent operation of removing and then realigning the dust seal as the main shaft was lowered into the eccentric bushing. Realignment was a slow, careful operation. Typically, we saw a person under the suspended 150-ton load guiding and adjusting the seal as the main shaft was lowered. Fingers, hands and even arms had no protection from the many tons they were assisting.

We considered many alternatives to decrease turnaround time in replacing the dust seal and in reducing injuries that also contribute to a longer turnaround time (decreased profitable service). We have invented a dust seal assembly with self-aligning guide to replace the original equipment manufacturer (OEM) dust seals that have no self-alignment capability. A worker has been standing under the crusher's suspended main shaft tons and manually and painstakingly pushing and pulling OEM seal into alignment. Because mining equipment is usually far from population centers, the injured employee cannot be treated quickly. Multiple fallouts from such an injury is an injured or dead worker, discouraged coworkers and the more immediate problem of lost work time of the crusher.

The material for our self-aligning seal assembly is chosen for strength and stretchiness and includes but is not limited to rubber, plastic, metal and a combination thereof. Both the dust seal and seal guide require slippery surfaces to perform their jobs of sliding up and down with gyrations and guiding alignment with little friction, respectively. Many materials have slippery surfaces, including but not limited to fluoropolymers, plastic, elastomers, silicones and urethane. The dust seal and the seal guide may be manufactured from different materials. The dust seal may be made out of materials that are selected for sealing and low friction properties, including but not limited to fluoropolymers, plastics, elastomers, silicones, and the like. The seal guide is preferably made primarily of more rigid materials to enable self-alignment of the dust seal assembly. A soft and pliable material may flex and bend and not adequately provide the required forces to align the dust seal assembly. Suitable seal guide materials include but are not limited to steel, composite material, polyoxymethylene (POM), also known as acetal, polyacetal and polyformaldehyde, which is a thermoplastic sold by such names as DELRIN, CELCON, RAMTAL, DURACON. KEPITAL and HOSTAFORM. The material or combination or materials provides the guide with the rigidity to withstand the high pressures generated by the 150-ton main shaft.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As shown in FIG. 1, an exemplary gyratory crusher 11 comprises a main shaft 30 that extends up into a stationary bowl 20. The main shaft as configured has a mantel 32 or main shaft cone 34 and the stationary bowl 20 is configured with concaves 22 on the interior surface. The main shaft 30 extends down to a main shaft drive portion 38 and a seal assembly 16 seals dust between the main shaft 30 and an air tower 24.

Figure 2:
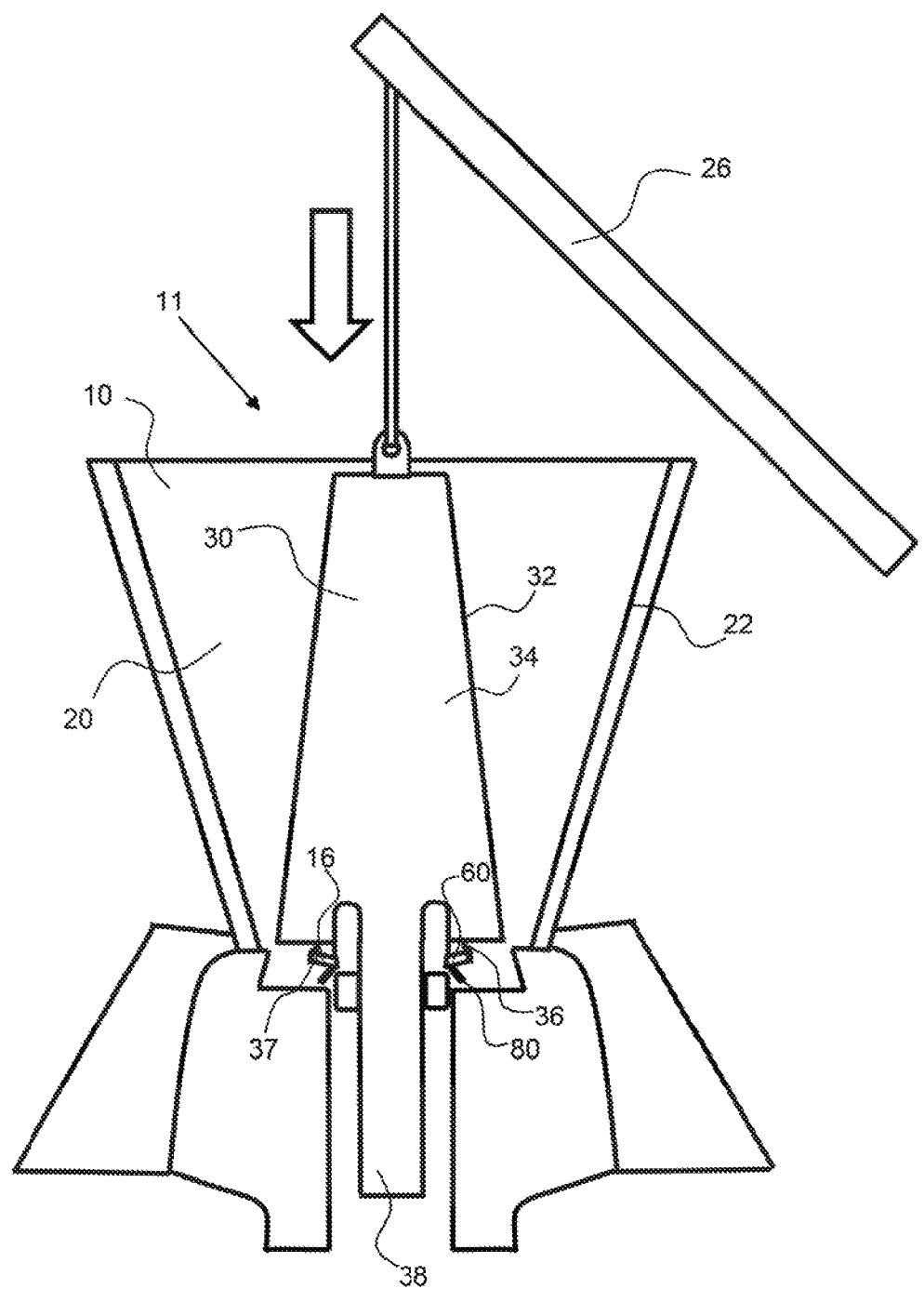
FIG. 2 shows a cross-sectional view of a gyratory crusher having a main shaft being lowered into position within the stationary bowl, and a dust seal assembly having a seal guide that self-aligns the main shaft into position.

As shown in FIG. 2, a main shaft 30 of a gyratory crusher 11 is being lowered into position within the stationary bowl 20. Main shafts 30 can be very large and heavy and a crane 26 is often used to lower the main shaft 30 into position. The exemplary seal assembly 16, having a seal guide 80 enables the main shaft to be positioned without aid from one or more people to visually and manually align the main shaft 30 into position. This reduces the risk of injury to those who would otherwise be required for alignment; usually positioned inside the crusher and under the main shaft.

Figure 3:
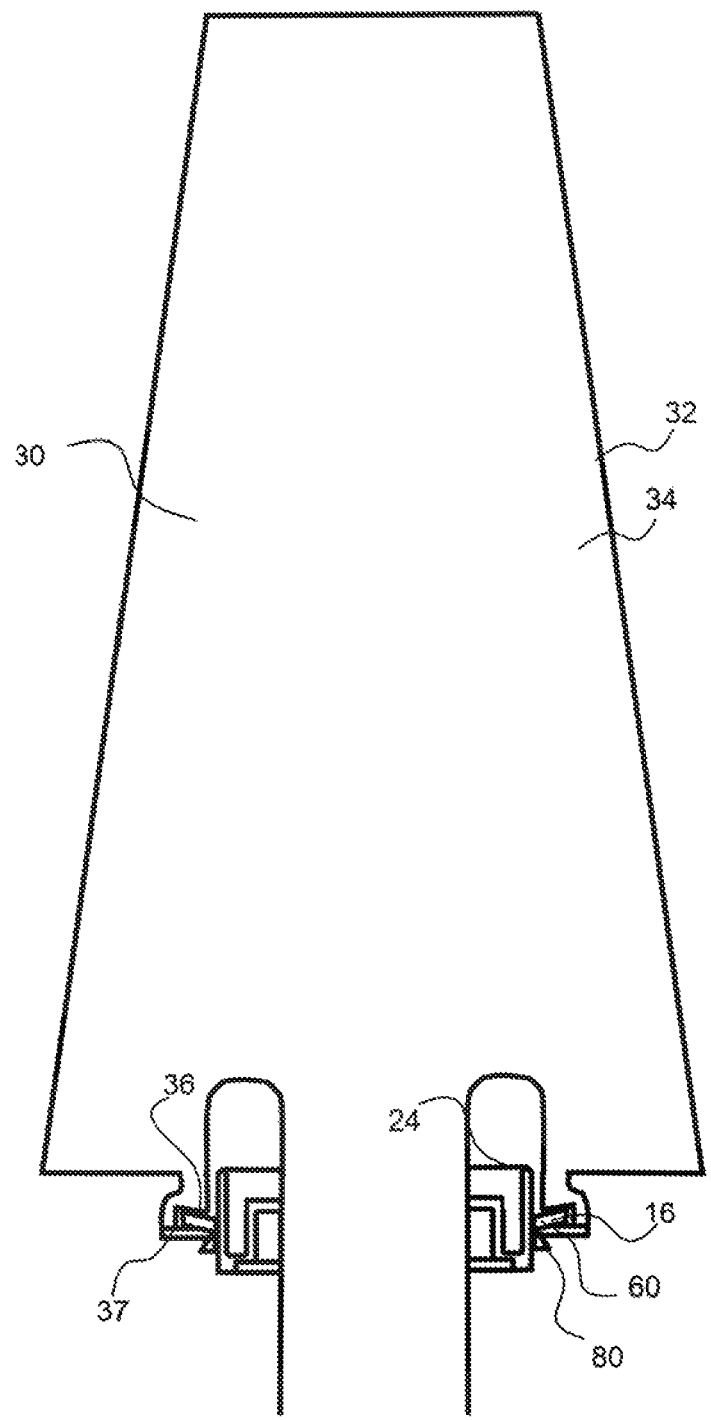
FIG. 3 shows a cross-sectional view of an exemplary gyratory crusher main shaft having an exemplary dust seal assembly.

As shown in FIG. 3, an exemplary dust seal assembly 16 comprising a dust seal 60 and a seal guide 80 is configured between the main shaft 30 of a gyratory crusher and a retainer seal retainer. The seal provides a floating seal between the gyrating main shaft 30 and the stationary air tower 24.

Figure 4:
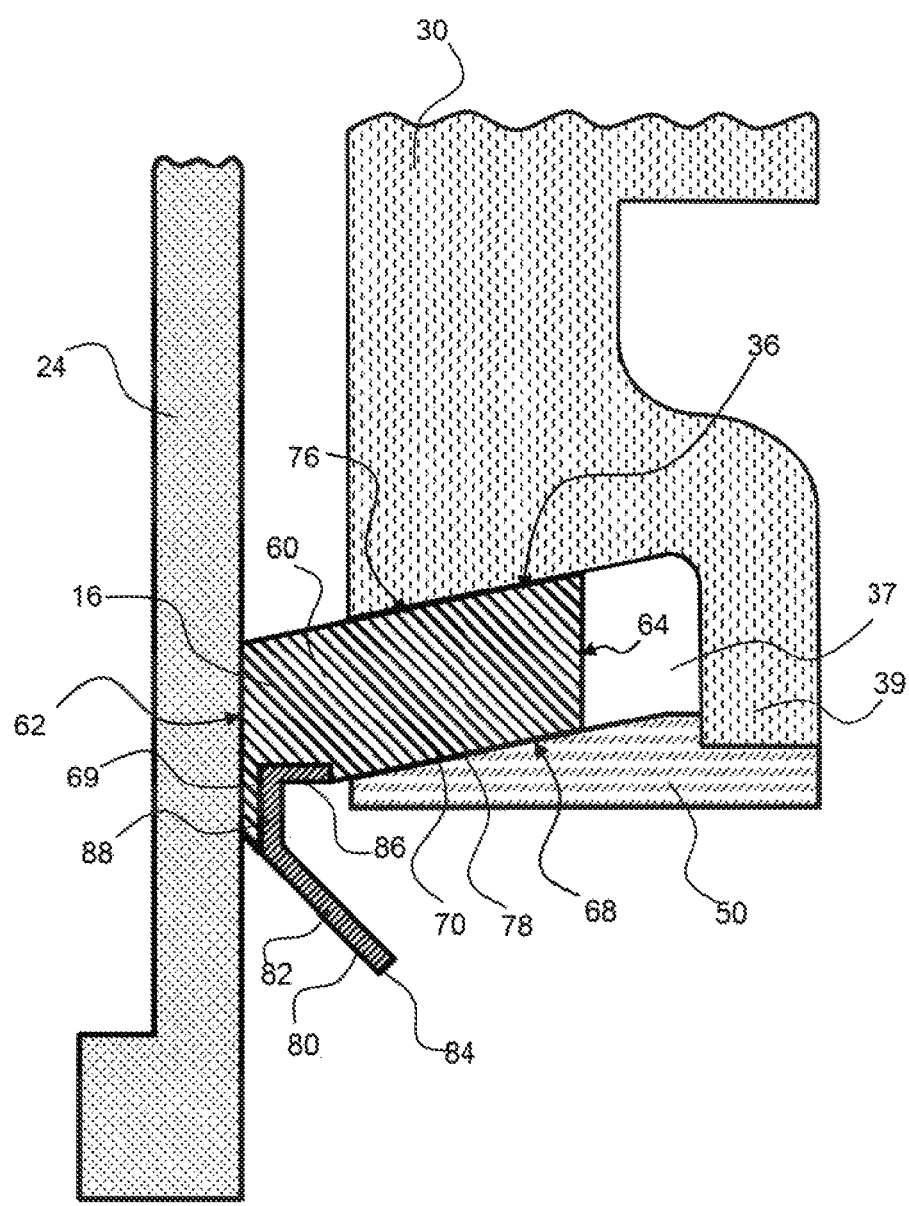
FIG. 4 shows a cross-sectional view of an exemplary dust seal assembly having a dust seal and an attached dust seal guide configured to seal air tower and main shaft.

As shown in FIG. 4, an exemplary dust seal assembly 16 has a dust seal 60 and an attached dust seal guide 80 configured to seal the air tower 24 and main shaft 30. The dust seal has a top surface 36 with a top seal portion 76 that seals against the main shaft. The bottom surface 68 of the dust seal 60 has a bottom seal portion 78 along the seal retainer 50. A seal channel 37 is formed between the main shaft channel extension 39 and the seal retainer 50. The dust seal 60 extends into the seal channel 39 to an extended end 64 and the opposing end of the dust seal 60, the inner seal surface 62 is sealed against the air tower 24. A seal extension 69 extends down from the main dust seal body along the air tower 24. The seal guide 80 is attached to the dust seal 60 and extends down from a connected portion 86 and outward from a position proximal the inner seal surface. The seal guide 80 has a vertical portion 88 and a funnel portion 82 that guides the seal assembly 16 and the main shaft 30 into position. The funnel end 84 extends out from an inner attached location to the dust seal 60. The seal guide 80 is convex in shape, getting larger in diameter as it extends downward and outward from the dust seal 60.

Figure 5:
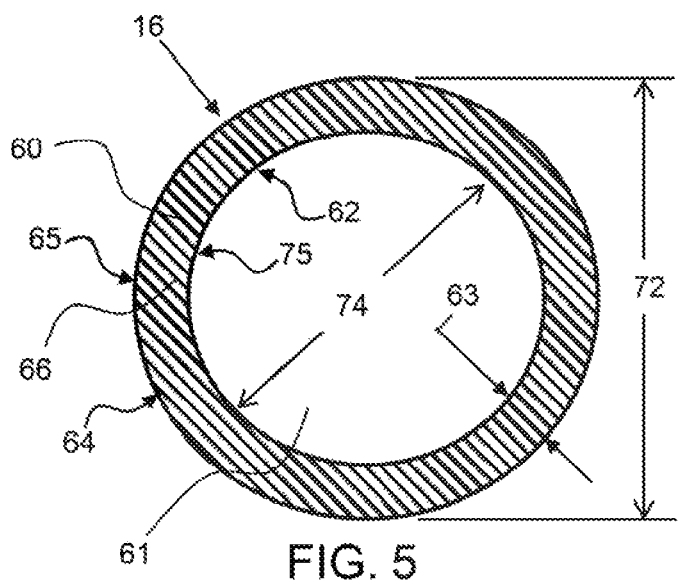
FIG. 5 shows a top view of an exemplary dust seal assembly.
Figure 6:
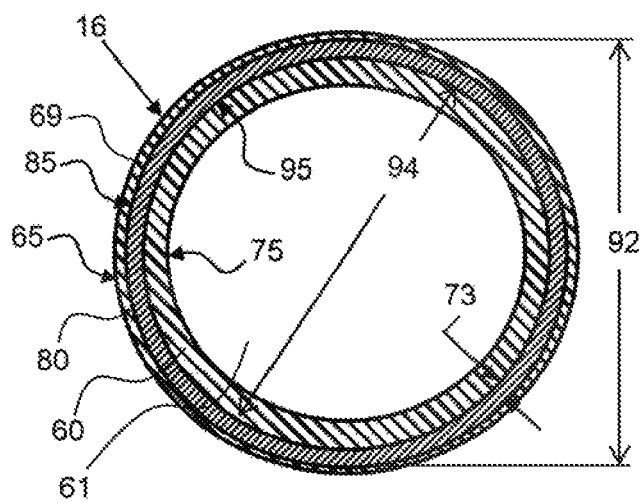
FIG. 6 shows a bottom view of an exemplary dust seal assembly.
Figure 7:
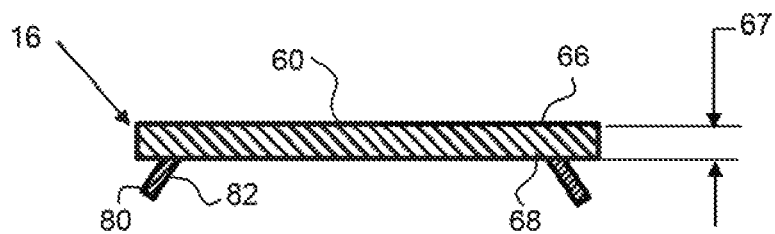
FIG. 7 shows a side view of an exemplary dust seal assembly.

Referring now to FIGS. 5 to 7, an exemplary dust seal assembly 16 is a seal ring having an aperture 61, an outer diameter 72 and an inner diameter 74. The width 63 of the dust seal extends from the inner seal surface 62, or inner perimeter 75, to the extended end 64, or outer perimeter 65, of the dust seal 60. A shown in FIG. 6, the top end of the seal guide 80 is configured within the width of the dust seal 60. The seal extension 69 is configured outside of the seal guide 80. The seal guide 80 has an outer diameter 92 and an inner diameter 94 and a width from an inner perimeter 95 to an outer perimeter 85. As shown in FIG. 7, the seal guide 80 extends down from the dust seal 60 in a convex orientation, wherein it becomes larger in diameter as it extends away from the dust seal 60. The dust seal 60 has a thickness 67 from a top surface 66 to a bottom surface 68.

Figure 8:
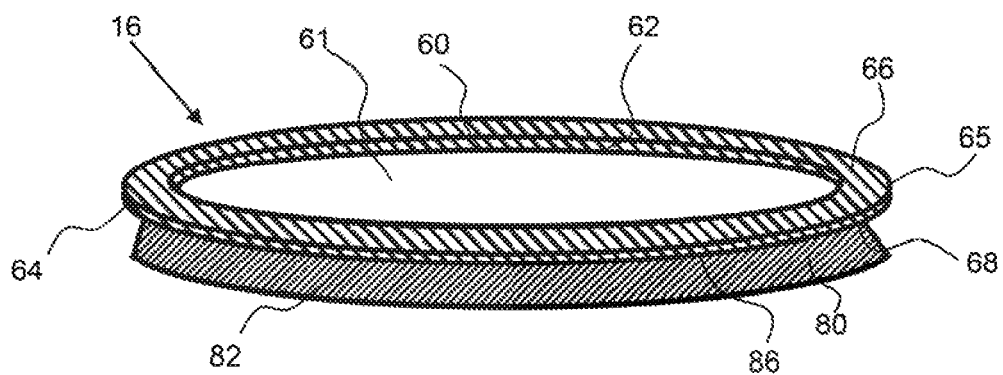
FIG. 8 shows a perspective view of an exemplary dust seal assembly.

As shown in FIG. 8, an exemplary dust seal assembly 16 comprises a dust seal 60 portion and seal guide 80. The dust seal 60 is a ring having an aperture 61. The dust seal 60 has a top surface 66 for sealing against the main shaft and a bottom surface 68 for sealing against the seal retainer. The seal guide 80 extends downward and outward from a connected portion or location. Put another way, the seal guide 80 flares outward from a connect location or from the bottom of the dust seal 60.

Figure 9:
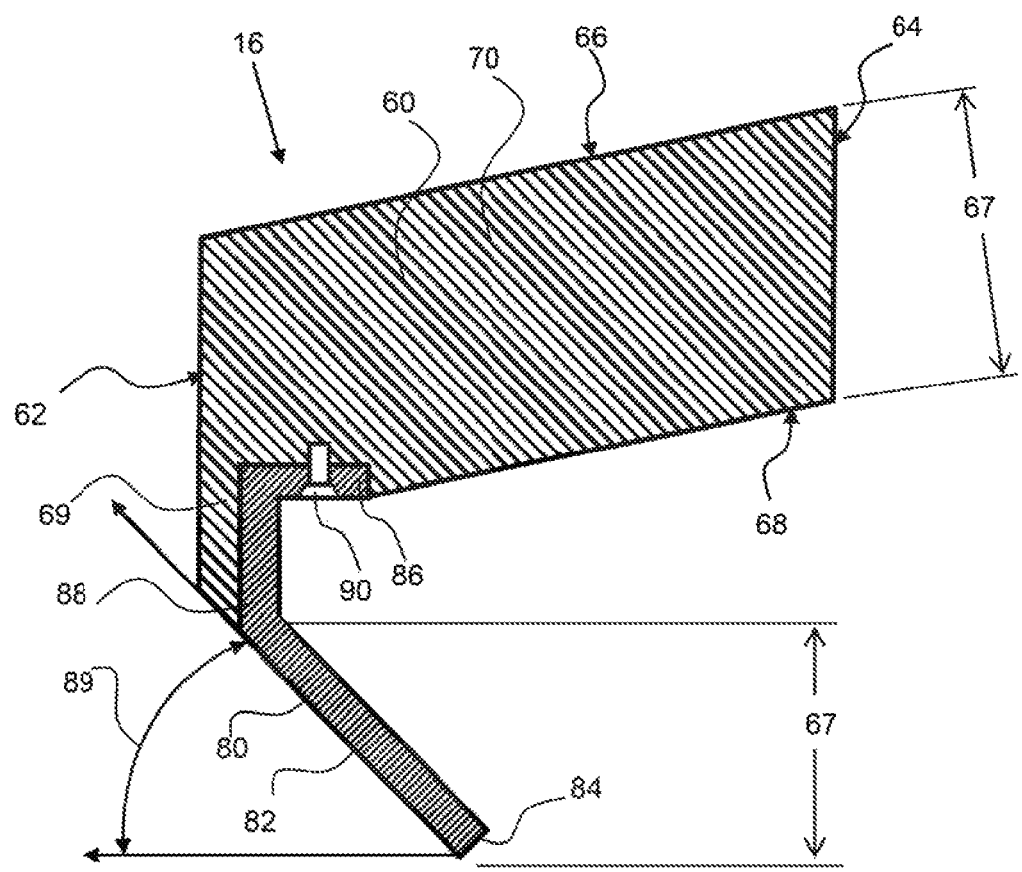
FIG. 9 shows a cross-sectional view of an exemplary dust seal assembly having a dust seal and an attached dust seal guide.

As shown in FIG. 9, an exemplary dust seal assembly 16 has a dust seal 60 and an attached dust seal guide 80. One or more fasteners 90, such as a bolt or screw secures the seal guide 80 to the dust seal 60. The seal guide 80 has a cone angle 89 as shown, this is measured from a horizontal line to the inside surface of the seal guide cone. The seal body portion 70 has a thickness 67 from the top surface 66 to the bottom surface 68. The width may be about 75 mm or more, about 100 mm or more, about 130 mm or more about 150 mm or more, about 200 mm or more and any range between the thicknesses provided. The seal guide extends down guide depth 67 from the bottom of the dust seal. This guide depth may be about 50 mm or more about 75 mm or more, about 100 mm or more, about 150 mm or more and any range between and including the guide depths provided.

While a continuous circular embodiment of the dust seal assembly has been described, such an assembly can also be fabricated of several parts, particularly for shipping to remote locations. For example, the dust seal can be manufactured in several portions, preferably interdigitating for installation. Such dust seal parts are optionally fabricated with outer indentations into which fits a steel wire to hold them together, but still permit the seal to float. Similarly the guide can be manufactured and shipped in separate pieces that are then assembled onsite at a crusher location. These may be assembled and attached to the dust seal with a band of steel or other similarly strong material.

While the dust seal is preferably sufficiently continuous around the shaft to block dust from getting into the lubricating oil, the seal guide need not be. The circumference of the dust guide can be interrupted, so long as it provides sufficient coverage to guide the dust seal and main shaft into place.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," and "example," and similar language throughout this specification may, but do not necessarily, all refer to the same embodiment, to different embodiments, or to one or more of the figures. Additional, reference to the words "embodiment," "example" or the like for two or more features, elements, etc., does not mean that the features are necessarily related, dissimilar, the same, etc.

Each statement of an embodiment or example is to be considered independent of any other statement of an embodiment despite any use of similar or identical language characterizing each embodiment. Therefore, where on embodiment is identified as "another embodiment," the identified embodiment is independent of any other embodiments characterized by the language "another embodiment." The features, functions and the like described herein are considered to be able to be combined in whole or in part one with another as the claims and/or art may direct, either directly or indirectly, implicitly or explicitly.

Reference throughout this specification to features, advantages, or similar language does not imply that all of features and advantages that may be realized with the present invention should be or are in any single embodiment of the invention. Rather, language referring to the features and advantages is understood to mean that a specific feature, advantage or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

As used herein, the terms "comprises." "comprising," "includes," "including," "has." "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

The invention claimed is:

1. A dust seal assembly for a rock crusher comprising:
   a) a dust seal ring comprising:
      i) an aperture;
      ii) a first radially extending surface against the main shaft;
      iii) a second radially extending surface;
      iv) inner perimeter;
      v) an outer perimeter;

vi) a width; and
vii) an inner seal surface configured around the inner perimeter; and
b) a seal guide comprising:
i) an axially extending connected portion extending from the second radially extending surface of the dust seal ring;
ii) a funnel portion; and
iii) a funnel end;
wherein the seal guide is attached to the dust seal proximal the inner seal surface by the axially extending connected portion and wherein the funnel portion extends outward to a funnel end in a convex shape.

2. The dust seal assembly for a rock crusher of claim 1, wherein the seal guide is connected to the second radially extending surface of the dust seal and projects inward from the inner seal surface.

3. The dust seal assembly for a rock crusher of claim 2, wherein the seal guide is configured under the dust seal ring, wherein the funnel end extends inwardly only a portion of the width of the dust seal.

4. The dust seal assembly for a rock crusher of claim 3, wherein the dust seal comprises a seal extension that extends from the dust seal body portion and along the inner seal surface.

5. The dust seal assembly for a rock crusher of claim 4, wherein the seal guide is configured inward from the seal extension.

6. The dust seal assembly for a rock crusher of claim 5, wherein the dust seal is a first material and the seal guide is second material and wherein the first and second materials are different materials.

7. The dust seal assembly for a rock crusher of claim 6, wherein the first material has a first hardness, and wherein the second material has a second hardness, wherein the second hardness is greater than said first hardness by at least 30%.

8. The dust seal assembly for a rock crusher of claim 6, wherein the first material is selected fluoropolymer and the second material is polyoxymethylene.

9. The dust seal assembly for a rock crusher of claim 6, wherein the seal guide is attached to the dust seal by a fastener.

10. The dust seal assembly for a rock crusher of claim 9, wherein the seal guide is sufficiently rigid to withstand pressures from the 150-ton main shaft.

11. A rock crusher comprising:
a) a main shaft;
b) a dust seal assembly comprising:
i) a dust seal ring comprising:
an aperture;
a first radially extending surface;
a second radially extending surface;
an inner perimeter;
an outer perimeter;
a width; and
an inner seal surface configured around said inner perimeter; and
ii) a seal guide comprising:
a axially extending connected portion extending from the second radially extending surface of the dust seal;
a funnel portion; and
a funnel end;
wherein the seal guide is attached to the dust seal proximal the inner seal surface by the axially extending connected portion and wherein the funnel portion extends outward to a funnel end in a convex shape;
c) a seal retainer configured along the second radially extending surface of the dust seal ring; and
d) an inner seal element;
wherein the dust seal assembly is configured around the main shaft;
wherein the dust seal is configured in a seal channel having a first portion against the main shaft and a second seal portion against the seal retainer; and
wherein the inner seal surface is sealed against the inner seal element.

12. The dust seal assembly for a rock crusher of claim 11, wherein the seal guide is connected to the second radially extending surface of the dust seal and projects inward from the inner seal surface.

13. The dust seal assembly for a rock crusher of claim 11, wherein the seal guide is configured under the dust seal ring, wherein the funnel end extends inwardly only a portion of the width of the dust seal.

14. The dust seal assembly for a rock crusher of claim 13, wherein the dust seal comprises a seal extension that extends from the dust seal body portion and along the inner seal surface.

15. The dust seal assembly for a rock crusher of claim 14, wherein the seal guide is configured inward from the seal extension.

16. The dust seal assembly for a rock crusher of claim 15, wherein the dust seal is a first material and the seal guide is second material and wherein the first and second materials are different materials.

17. The dust seal assembly for a rock crusher of claim 16, wherein the first material has a first hardness, and wherein the second material has a second hardness, wherein the second hardness is greater than said first hardness by at least 30%.

18. The dust seal assembly for a rock crusher of claim 16, wherein the first material is selected fluoropolymer and the second material is polyoxymethylene.

19. The dust seal assembly for a rock crusher of claim 11, wherein the seal guide extends away from the seal retainer.

20. The dust seal assembly for a rock crusher of claim 11, wherein the seal guide is attached to the dust seal body by a fastener.

21. The dust seal assembly for a rock crusher of claim 11, wherein the seal guide is sufficiently rigid to withstand pressures from the 150 ton main shaft.

* * * * *